US011960961B2

(12) United States Patent
Gurevich et al.

(10) Patent No.: US 11,960,961 B2
(45) Date of Patent: Apr. 16, 2024

(54) AIMING PATTERNS FOR AUTO-FOCUS ROLLING SHUTTER CAMERA WITH DUAL IMAGING FOV AND ASSOCIATED SYSTEMS

(71) Applicant: ZEBRA TECHNOLOGIES CORPORATION, Lincolnshire, IL (US)

(72) Inventors: Vladimir Gurevich, Great Neck, NY (US); Carl D. Wittenberg, Water Mill, NY (US); David Tsi Shi, Setauket, NY (US); Chinh Tan, East Setauket, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/499,744

(22) Filed: Oct. 12, 2021

(65) Prior Publication Data
US 2023/0114364 A1 Apr. 13, 2023

(51) Int. Cl.
*G06K 7/10* (2006.01)

(52) U.S. Cl.
CPC ...... *G06K 7/10811* (2013.01); *G06K 7/10732* (2013.01); *G06K 7/10831* (2013.01); *G06K 7/1096* (2013.01)

(58) Field of Classification Search
CPC ....... G06K 7/10831; G06K 2207/1011; G06K 7/10732; G06K 7/10801; G06K 7/10811; G06K 2207/1013; G06K 7/1096
See application file for complete search history.

(56) References Cited

U.S. PATENT DOCUMENTS

| | | | | |
|---|---|---|---|---|
| 2009/0057413 | A1* | 3/2009 | Vinogradov | G02B 27/20 235/462.35 |
| 2010/0155481 | A1* | 6/2010 | Vinogradov | G06K 7/109 235/462.41 |
| 2014/0312121 | A1* | 10/2014 | Lu | G06K 19/0614 235/468 |
| 2015/0144699 | A1* | 5/2015 | Sackett | G06K 7/10831 235/462.24 |
| 2017/0300728 | A1* | 10/2017 | Feng | G06K 19/06037 |
| 2022/0224823 | A1* | 7/2022 | Poloniewicz | H04N 5/23218 |
| 2023/0005234 | A1* | 1/2023 | Wang | H04N 25/531 |

* cited by examiner

Primary Examiner — Suezu Ellis
(74) Attorney, Agent, or Firm — Yuri Astvatsaturov

(57) ABSTRACT

A system and methods for providing aiming guidance for an imaging system. The system includes an illumination field source configured to provide illumination along a illumination optical axis to (i) illuminate a target and (ii) indicate a near field of view of the imaging system and a far field aiming source configured to provide a radiation pattern along an aiming optical axis to indicate a far field of view of the imaging system. Near field optics are configured to receive the first illumination from the near field illumination source and to form the first illumination to provide illumination to, and indicate to a user or machine vision system, the near field of view of the imaging system, and far field optics are configured to receive radiation from the aiming source and provide the radiation pattern to the far field to indicate the far field of view of the imaging system.

5 Claims, 8 Drawing Sheets

AIMING PATTERNS FOR AUTO-FOCUS ROLLING SHUTTER CAMERA WITH DUAL IMAGING FOV AND ASSOCIATED SYSTEMS

BACKGROUND

Typical barcode readers, such as handheld barcode readers, point of sale scanners, and direct part marking scanners, require proper illumination of targets to obtain high quality, low-blur images to decode barcodes in the images. The illumination source is essential for decoding of barcodes in captured images and various factors such as time of day, direction of illumination, illumination intensity, and light type or light source type all effect how effective a system may be in decoding barcodes. Additionally, the type of barcode, the reflectivity of a target, and the distance or size of a target are also all important factors in decoding barcodes in captured images.

user or operator of a scanner must either position a target object relative to a field of view of a scanner, or position the scanner, such as a handheld scanner, at a position to image or scan a target. This requires the target to be within a field of view of the scanner at an appropriate distance from the scanner. If the target is too far away from the scanner, the image may not be properly illuminated or have a quality capable of decoding a barcode imaged therein. Some scanners rely on a user to discern the field of view of the scanner, while others may employ a mechanism to provide guidance to a user such as a physical window to place an object on or in front of. Additionally, the field of view of a scanner may change at different distances from the scanner, resulting in the ability to scan a target at one distance from the scanner, while not being able to scan the same target at other distances closer or further from the scanner. Many scanner systems do not provide adequate guidance to a user resulting in long scanning times and scanning errors due to objects being too close, too far, outside of a field of view of the scanner, or partially in the view of view of the scanner. As such, it could be beneficial for a scanning system to improve scanning speed times by providing a user with guidance to the field of view of a scanning system at various distances from the scanner.

SUMMARY

In an embodiment, the present invention is an aiming system for a multiple field of view imaging system. The system comprises an illumination field source configured to provide illumination to (i) illuminate a target and (ii) indicate a near field of view of the imaging system, and a far field aiming source configured to provide a radiation pattern to indicate a far field of view of the imaging system. The system further includes near field optics configured to receive the illumination from the illumination field source and further configured to form the first illumination to provide near field illumination to the near field of view of the imaging system, wherein the near field illumination has a vertical field of view angle and a horizontal field of view angle, and far field optics configured to receive the second illumination from the aiming source and further configured to provide the radiation pattern to the far field to indicate the far field of view of the imaging system.

In a variation of the current embodiment, the illumination source comprises alight emitting diode. In another variation of the current embodiment, the far field aiming source comprises a laser diode. In yet another variation of the current embodiment, the illumination comprises a rectangular illumination field indicative of the near field of view of the imaging system.

In another embodiment, the present invention is an imaging system comprising an illumination field source configured to provide illumination to (i) illuminate a target and (ii) indicate a near field of view of the imaging system, and a far field aiming source configured to provide a radiation pattern to indicate a far field of view of the imaging system. The system further includes near field optics configured to receive the illumination from the illumination field source and further configured to form the first illumination to provide near field illumination to the near field of view of the imaging system, wherein the near field illumination has a vertical field of view angle and a horizontal field of view angle, and far field optics configured to receive the second illumination from the aiming source and further configured to provide the radiation pattern to the far field to indicate the far field of view of the imaging system. The system has a rolling shutter sensor disposed to receive light from the target and the rolling shutter sensor is configured to image the target in either of (i) the near field of view or (ii) the far field of view of the imaging system.

In a variation of the current embodiment, the rolling shutter sensor comprises a plurality of rows of pixels with each row having an active imaging state wherein the row is exposed to collect light, and an inactive state wherein the row is not exposed and therefore not collecting light, and further comprising a controller in communication with the aiming source to control operation of the aiming source to cause the aiming source to provide the radiation pattern during a period of time corresponding to a time during which a subset of the plurality of rows of pixels is in the inactive state.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
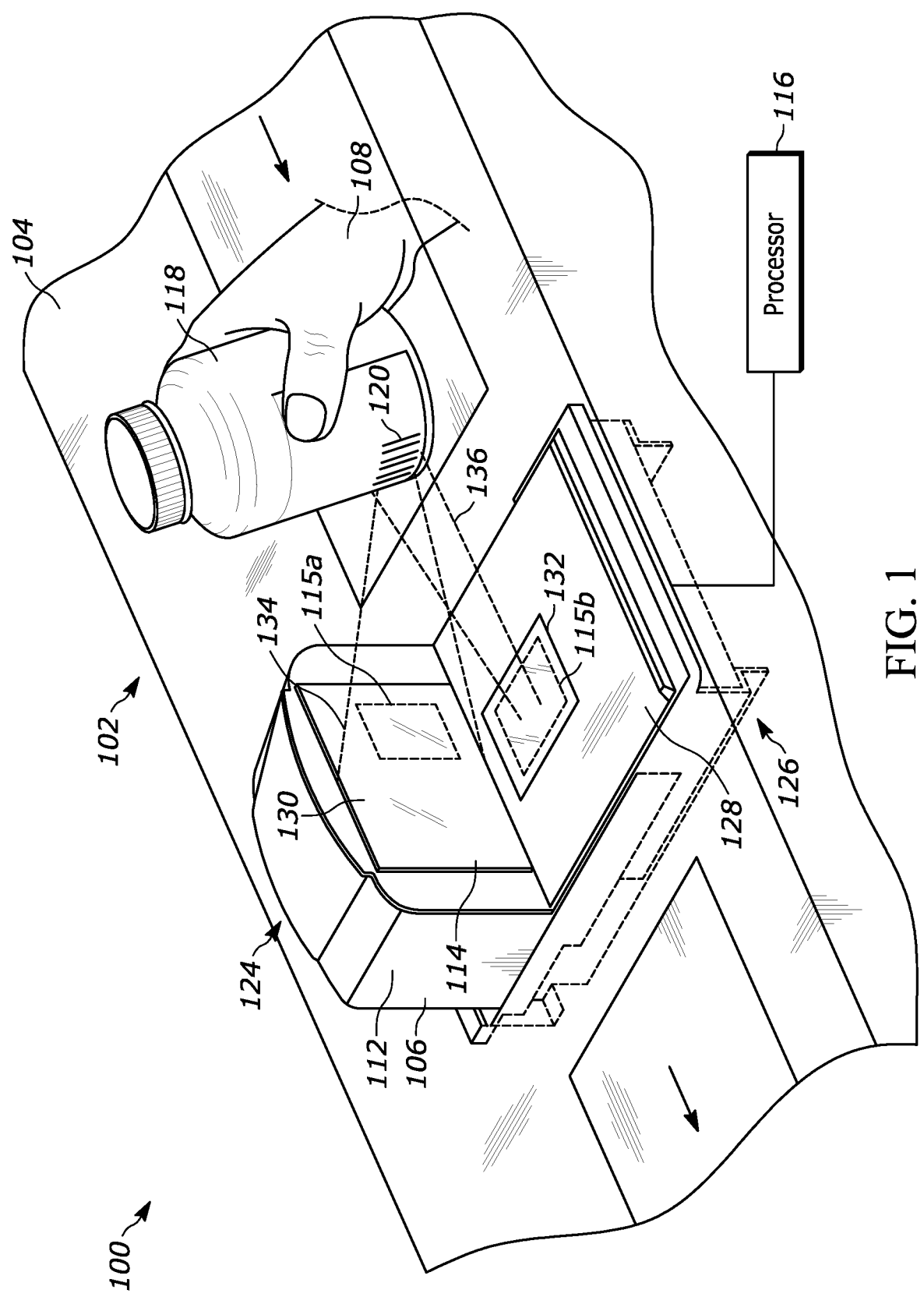
FIG. 1 illustrates a perspective view of an example point-of-sale (POS) system that may employ a field of view aiming system for multiple fields of view.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Efficient operation of a scanner requires that a target objects for scanning be in a field of view of the scanner. As such, scanner systems may include means for indicating a field of view to a user such as translucent tables or windows indicative of the field of view. While a window may assist with communicating a field of view for a stationary system, handheld scanners may benefit from further measure to indicate a field of view of the scanner. Additionally, a user may position items to be scanned at various distances from the scanner which may result in the target being outside of the field of view, or partially within the field of view. The disclosed system provides visual guidance indicative of a new field of view and a far field of view of a scanner. Further, the system utilizes a rolling shutter sensor to allow for the use of a laser aiming system while not capturing any laser light in an image. The disclosed system may be employed in autofocus imaging systems, auto-zoom imaging systems, imaging systems that employ multiple cameras having multiple fields of view, or another imaging system which captures images at various fields of view.

FIG. 1 illustrates a perspective view of an example point-of-sale (POS) system 100 that may employ a field of view aiming system for multiple fields of view, in accordance with the teachings of this disclosure. In the example shown, the system 100 includes a workstation 102 with a counter 104 and a bi-optical (also referred to as "bi-optic") barcode reader 106. The barcode reader 106 may also be referred to as a bi-optic scanner or an indicia reader. The POS system 100 is often managed by a store employee such as a clerk 108. However, in other cases, the POS system 100 may be part of a so-called self-checkout lane where instead of a clerk, a customer is responsible for checking out his or her own products. Whether operated by a clerk or a customer, scanning efficiency may be increased by the implementation of a field of view aiming system to indicate one or more fields of view of the barcode reader 106.

The barcode reader 106 includes a housing 112 that houses an optical imaging assembly 114 and one or more field of view (FOV) aiming systems 115a and 115b. The optical imaging assembly 114 includes one or more image sensors and is communicatively coupled to a processor 116. The image sensors may include one or more color cameras, one or more monochrome imagers, one or more optical character readers, etc. The processor 116 may be disposed within the barcode reader 106 or may be in another location. The optical imaging assembly 114 includes one or more fields of view (FsOV). Further, the optical imaging assembly 114 is operable to capture one or more images of one or more targets 118 entering and/or being within a FOV of the optical imaging assembly 114. The aiming systems 115a and 115b provide illumination indicative of one or more FsOV of the optical imaging assembly 114. The aiming systems 115a and 155b may be disposed in the housing 112 behind first and second transmissive windows 130 and 132, respectively. The first and second transmissive windows 130 and 132 both transmit light from the aiming systems 115a and 115b to FsOV of the optical imaging assembly 114, and transmit light from the one or more targets 118 to image the one or more targets 118 on image sensors of the optical imaging assembly 114. While referenced herein as one or more targets 118, a target 118 may also be referred to herein as an object of interest, or in short, an object. In any embodiment or description, the target 118, or object of interest, includes one or more product codes 120, barcodes, or indicia indicative of information associated with the target 118.

In practice, the target 118, depicted as a bottle in the example shown, is swiped past the barcode reader 106 within a FOV of the barcode reader 106. While illustrated as a single target in FIG. 1 for simplicity and clarity, it is envisioned that the bottle represents multiple targets 118 to be imaged by the optical imaging assembly 114, and that the multiple targets 118 may be within a FOV of the optical imaging system 114 simultaneously or nearly simultaneously. Each of the aiming systems 115a and 115b provide guidance, in the form of light, to the clerk 108 or customer as to the location of each FOV of the optical imaging assembly 114. In providing such aiming guidance, one or more product codes 120 associated with the targets 118 are more easily positioned within the FOV of the optical imaging assembly 114 increasing scanning efficiency. In the example shown, the product code 120 is a one dimensional bar code. However, the product code 120 may alternatively be a radio-frequency identification (RFID) tag, a QR code, a 2D barcode, a static code, a dynamic code, an alphanumeric, and/or any other product identifying code.

In response to capturing the one or more images (e.g., image data), in an example, the processor 116 processes the image data to determine an absence, a presence, movement, etc. of the targets 118 within and/or relative to the FOV. Specifically, the processor 116 processes the image data in real time to determine when one or more of the targets 118 enters the FOV of the optical imaging assembly 114, when one or more targets 118 are within the FOV of the optical imaging assembly 114, and/or when one or more of the targets 118 exits the FOV of the optical imaging assembly 114.

In some examples, the optical imaging assembly 114 has tunable imaging focal lengths including a near focal length and a far focal length. The near focal length enables capturing images wherein the foreground in which the one or more targets 118 may be present is in focus and better isolated from the out of focus background, thereby allowing for the targets 118 to be more easily identified and/or tracked within the FOV of the near focus distances. Further, the far focal length provides imaging of one or more targets 118 at further distances from the optical imaging assembly 114. Each of the near and far focal lengths may have different fields of view, and therefore, the aiming systems 115a and 115b may provide different illumination and aiming radiation guidance at the near and far focal lengths. Further, a single imaging sensor may be capable of capturing images at both the near and far focal lengths, or multiple cameras or imaging sensors may be employed to capture images at the different focal length distances. In some examples, processing one or more images allows the processor 116 to identify an object that is moving in a FOV and to identify an object that is not moving in the FOV. The processing may also allow the processor 116 to differentiate between a larger item(s) within the FOV and a smaller item(s) within a FOV, a direction that the targets 118 are moving within the FOV, if the target 118 is moving from one FOV to another FOV, identify a FOV containing the target, etc.

The processor 116 may be configured to identify the one or more targets 118 based on at least a size of the targets 118, a color of the targets 118, a shape of the targets 118, a feature of the targets 118, a logo displayed on the targets 118, etc. In some examples, identifying the product code 120 includes successfully decoding symbology associated with the targets 118. However, if the targets 118 are detected exiting the FOV and/or entering and exiting the FOV without the product code 120 being identified, the processor 116 may generate an alert indicative of the targets 118 not being scanned. Such an approach may be advantageous in detecting an individual (e.g., the clerk 108) attempting to avoid scanning the targets 118, which may be referred to as the act of "scan avoidance."

The housing 112 includes a raised housing 124 and a lower housing 126. The raised housing 124 may be referred to as a tower or first housing portion and the lower housing 126 may be referred to as a second housing portion. The lower housing 126 includes a top portion 128 with the second optically transmissive window 132, underneath which is contained one or more imaging sensors and the aiming system 115b. The second window 132 is positioned within the top portion 128 along a generally horizontal plane relative to the overall configuration and placement of the barcode reader 106. In some embodiments, the top portion 128 may include a removable or a non-removable platter (e.g., a weighing platter). The top portion 128 may also be viewed as being positioned substantially parallel with the counter 104 surface. As set forth herein, the phrase "substantially parallel" means+/−10° of parallel and/or accounts for manufacturing tolerances. It's worth noting that while, in FIG. 1, the counter 104 and the top portion 128 are illustrated as being about co-planar, that does not have to be the case for the platter and the counter 104 to be considered substantially parallel. In some instances, the counter 104 may be raised or lowered relative to the top surface of the top portion 128, where the top portion 128 is still viewed as being positioned substantially parallel with the counter 104 surface. The raised housing 124 is configured to extend above the top portion 128 and includes a first optically transmissive window 130 positioned in a generally upright plane relative to the top portion 128 and/or the second window 132. One or more imaging sensors, and the aiming system 115a are disposed behind the first optically transmissive window 130 inside of the top portion 128 of the housing 112. Note that references to "upright" include, but are not limited to, vertical. Thus, as an example, something that is upright may deviate from a vertical axis/plane by as much as 45 degrees.

The optical imaging assembly 114 includes the image sensor(s) configured to digitally image the target 118 to scan and read the product code 120 through at least one of the first and second windows 130, 132. In the example shown, the FsOV of the optical imaging assembly 114 include a first FOV 134 through the first transmissive window 130, and a second FOV 136 through the second transmissive window 132. As illustrated, the first FOV 134 and the second FOV 136 not orthogonal, but in examples, the first and second FsOV 134 and 136 may be orthogonal, collinear, or at any angle relative to each other. Further, the first FOV 134 may have a near FOV and a far FOV along the first FOV with each of the near and far FsOV being different FsOV (e.g., having different full-field angles, different horizontal FsOV, different vertical FsOV, different diagonal FsOV, having different FOV shapes, etc.). The aiming system 115a may provide aiming guidance through light and illumination to provide guidance to a user (e.g., the clerk 108) of the first FOV 134 at near and far focal distances to allow for efficient imaging of the target 118. Similarly, the second FOV 136 may have more than one FOV at various distances from the optical imaging assembly 114, and the aiming system 115b may provide FOV guidance to a user at various distances from the optical imaging assembly 114. As discussed further herein, the aiming systems 115a and 115b may include one or more LEDs, black body light sources, lasers, laser diodes, or other radiation source for providing illumination and/or light patterns to indicate a FOV of the imaging assembly 114.

Figure 2:
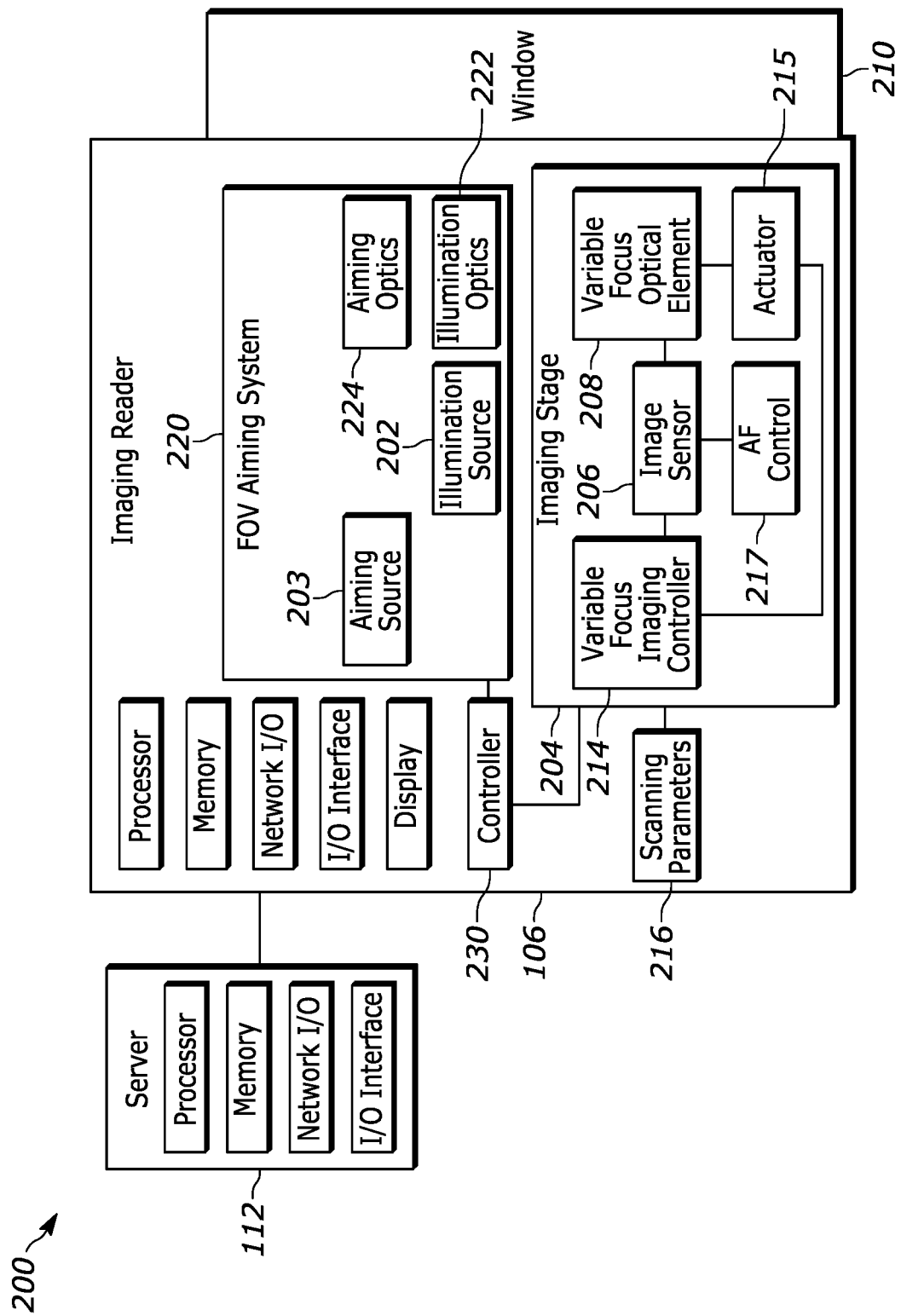
FIG. 2 illustrates a block connection diagram of system including an imaging reader and field of view (FOV) aiming system.

FIG. 2 illustrates a block connection diagram of system 200 including an imaging reader 106. In FIG. 2 the imaging reader 106 may have one or more processors and one or more memories storing computer executable instructions to perform operations associated with the systems and methods as described herein. The imaging reader 106 includes a network input/output (1/O) interface for connecting the reader to the server 112, an inventory management system (not shown), and other imaging readers. These devices may be connected via any suitable communication means, including wired and/or wireless connectivity components that implement one or more communication protocol standards like, for example, TCP/IP, WiFi (802.11b), Bluetooth, Ethernet, or any other suitable communication protocols or standards. The imaging reader 106 further includes a display for providing information such as visual indicators, instructions, data, and images to a user.

In some embodiments, the server 112 (and/or other connected devices) may be located in the same scanning station 100. In other embodiments, server 112 (and/or other connected devices) may be located at a remote location, such as on a cloud-platform or other remote location. In still other embodiments, server 112 (and/or other connected devices) may be formed of a combination of local and cloud-based computers.

The server 112 is configured to execute computer instructions to perform operations associated with the systems and methods as described herein. The server 112 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM WebSphere platform, etc. Other technologies or platforms, such as Ruby on Rails, Microsoft .NET, or similar may also be used.

In the illustrated example, the imaging reader 106 includes a FOV aiming system 220 with an illumination source 202 and an aiming source 203. The illumination source 202 may be a visible light source (e.g., a LED emitting at 640 nm white light source, etc.), capable of generating an illumination beam that illuminates a working range of a FOV of the imaging reader 106. In examples, the illumination source 202 is configured to illuminate a near FOV through a working distance of the near FOV. The illumination intensity of the illumination source 202 and the sensitivity of an imaging reader can determine the further and closest distances, defining the distance of the working range of the near FOV (also termed the scanning range of the near FOV), over which a target can be scanned and a barcode on the target can be decoded. The illumination source 202 is controlled by a controller 230 or the processor and may be a continuous light source, an intermittent light source, or a signal-controlled light source, such as a light source trigged by an object detection system coupled (or formed as part of, though not shown) to the imaging reader 106. The illumination source 202 may be an isotropic light source, an omnidirectional light source, or a highly directional light source. Further, illumination optics 222 (e.g., lenses, mirrors, shutters, apertures, diffractive elements, binary optics, kinoforms, microlenses, scanning systems and elements, etc.) may be used to focus, direct the propagation of, or shape the illumination field provided by the illumination source 202. The illumination optics 222 are disposed to receive the light from the illumination source 202 and to provide the illumination to the near FOV of the imaging reader 160. Together, the illumination source 202 and illumination optics 222 shape an illumination field that is indicative of the near FOV of the imaging reader 106. For example, the illumination source 202 may be an omnidirectional LED that provides an illumination field, and associated optics may shape the illumination field to be a rectangular field having a horizontal full field angle of 30 to 70 degrees, such as 50 degrees for example, and a vertical full field angle of 15 to 40 degrees, such as 28 degrees for example. Additionally, the illumination source 202 and illumination optics 222 may provide illumination having a rectangular field, square field, circular field, Gaussian field, elliptical field, or another field profile. In any embodiments, the illumination source 202 and illumination optics 222 provide illumination indicative of the near FOV, and provides to a user the location, size, and shape of the near FOV of the imaging reader 106.

The aiming source 203 may be a visible light source (e.g., a laser diode emitting at 640 nm Or 530 nm) capable of generating an aiming pattern that is visible along a working distance of a FOV of the imaging reader 106. In examples, the aiming source 203 is configured to provide aiming radiation in the form of the aiming pattern along a working distance of a far FOV of the imaging reader 106. For example, the aiming pattern may be a dashed line provided by a laser diode emitting at 640 nm, and the provided aiming pattern may indicate to a user the location and width of the far FOV. The aiming source 203 is controlled by the controller 230 or the processor and may be continuous, pulsed, signal controlled, timed, or an otherwise intermittent source. For example, the aiming pattern may be a horizontal line, and the imaging reader 106 may have a rolling shutter sensor. In such an embodiment, the controller 230 may turn off the aiming source 203 while certain pixels of the rolling shutter sensor are actively imaging the region of the FOV that contains the aiming pattern. Therefore, the rolling shutter sensor does not capture any of the light of the aiming pattern in the obtained image. The synchronization and control of the aiming source 203 will be further discussed herein with reference to FIG. 9. The aiming source 203 may be an omnidirectional source, a highly directional source such as a laser, or another source and associated optics for generating a light pattern. Aiming optics 224 (e.g., lenses, mirrors, shutters, apertures, a pattern mask, diffractive elements, scanning elements, binary optics, microlenses, kinoforms, etc.) are disposed to receive the aiming radiation and to focus, direct the propagation of, or shape a field of radiation or light provided by the aiming source 203. The aiming source 203 and aiming optics 224 shape a light pattern indicative of a FOV of the imaging reader 106. For example, the aiming source 203 may be a laser diode that provides red or green light (i.e., ~650 nm or ~550 nm), and the aiming optics 224 shape the light to be a pattern indicative of the far FOV of the imaging reader 106. The aiming pattern may be a solid line, a dashed line, a dotted line, a line containing both dashes and dots, or another pattern. As described herein, the aiming pattern may be a one dimensional pattern (e.g., a dashed line, dotted line, etc.), or a two dimensional pattern (e.g., multiple horizontal line patterns at different vertical positions, a circle, a plurality of dots, etc.) In any embodiments, the aiming source 203 and aiming optics 224 provide light indicative of a FOV, and provide to a user the location, size, and shape of the far FOV of the imaging reader 106.

The imaging reader 106 further includes an imaging stage 204 having an imaging sensor 206 positioned to capture images of a target, such as the target 118 102 or another OOI, within a FOV of the imaging reader 106. In some embodiments, the imaging sensor 206 is formed of one or more CMOS imaging arrays. The imaging sensor 206 may be a rolling shutter sensor and the controller 230 may be in communication with both the imaging stage 204 and the FOV aiming system 220 to the aiming source 203 on and off dependent upon the operation of the rolling shutter sensor. For example, the aiming pattern provided by the aiming source 203 and aiming optics 224 may be a horizontal line centered vertically in the far FOV. The controller 230 may turn off the aiming source 203 during periods of time when the rolling shutter sensor is imaging the region of the far FOV that contains the aiming pattern, and the controller 230 may turn the aiming source back on once the rolling shutter sensor is no longer imaging the portion of the far FOV that contains the aiming pattern.

A variable focusing optical element 208 may be positioned between the imaging sensor 206 and a window 210 of the imaging reader 106. A variable focus imaging controller 214 is coupled to the variable focusing optical element 208 and controls the element 208 to define a plurality of imaging planes of the imaging sensor 206. Together, the image sensor 206, variable focus optical element 208, and variable focus imaging controller may each be part of an autofocus imaging system, and an autofocus control unit 217 may be in communication with one or more of the image sensor 206, variable focus optical element 208, and variable focus imaging controller 214 to perform autofocus operation of the imaging reader 106. In the illustrated example, the variable focus imaging controller 214 is coupled to the variable focusing optical element 208 through an actuator control unit 215 and bypasses the optional autofocus control unit 217. The actuator 215 may include a focusing lens drive, a shift lens drive, a zoom lens drive, an aperture drive, angular velocity drive, voice coil motor drive, and/or other drive units for controlling operation of the optical element 208, which itself may comprise multiple lens, lens stages, etc. The VF optical element 208 may be a deformable lens element, a liquid lens, a T-lens or another VF optical element. In some embodiments, the optical element includes a voice coil actuator motor in the actuator 215 that is controllably adjusted by the variable focus imaging controller 214 or the autofocus control unit 217.

Figure 5:
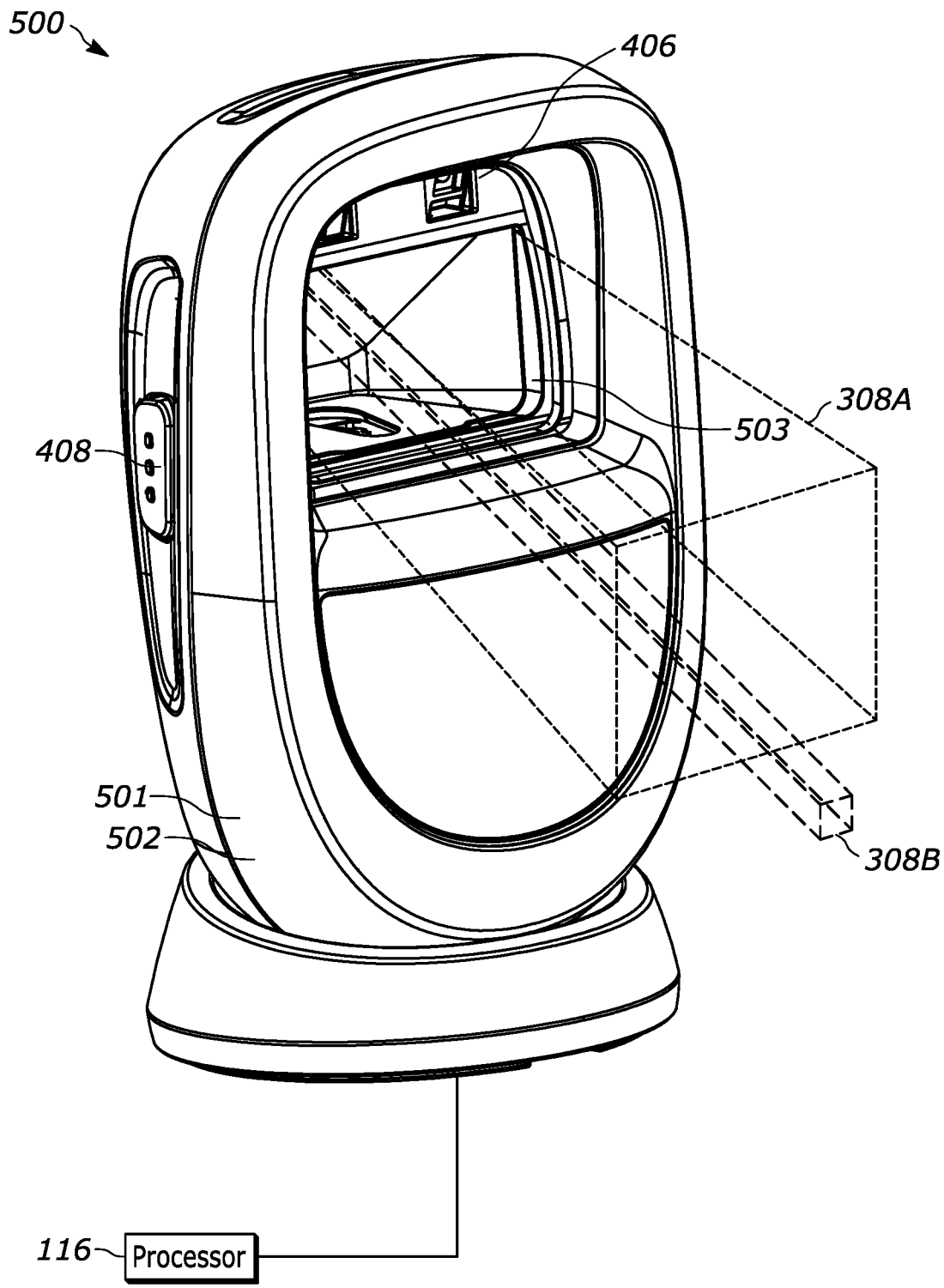
FIG. 5 illustrates a perspective view of an example handheld scanning device in accordance with a multi-FOV aiming system.

In some exemplary embodiments, the imaging reader 106 is implemented in a handheld bar code scanner device, such as shown in FIG. 5. When the handheld scanner is placed within a stationary cradle thereby establishing an upright scanning position, the handheld scanner may automatically sense that placement and enter the hands-free mode. In other exemplary embodiments, the imaging reader 106 is implemented as a multi-plane scanner, such as a bioptic scanner as shown in FIG. 1.

In embodiments, the imaging sensor 112 may be a charge coupled device, or another solid-state imaging device. The imaging sensor 112 may be a one megapixel sensor with pixels of approximately three microns in size. In embodiments, the imaging sensor includes 3 millimeter pixels, having a total of about 2 megapixels, resulting in an overall imaging sensor width and length of 3 microns in each dimension.

Figure 3:
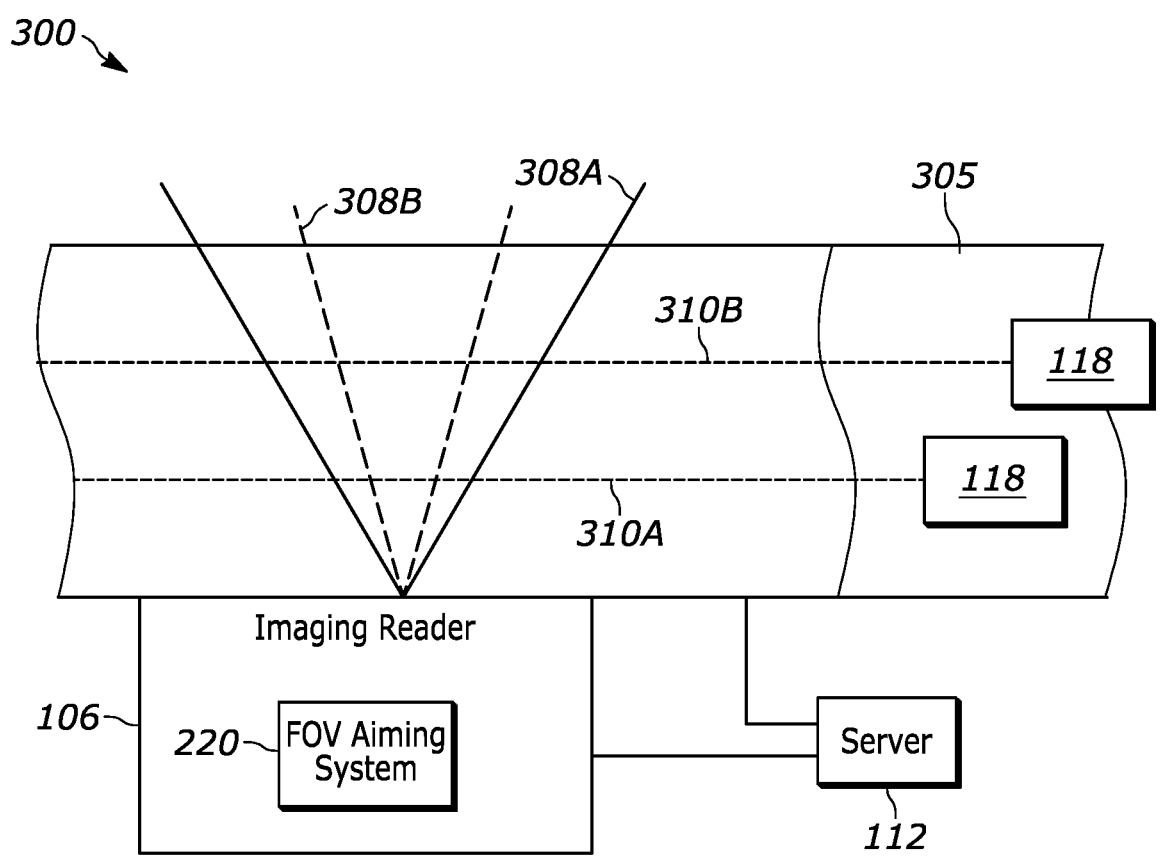
FIG. 3 illustrates an environment where embodiments of the multi-FOV aiming system may be implemented.

FIG. 3 illustrates an environment where embodiments of the multi-FOV aiming system may be implemented, including the systems and processes described and illustrated herein. In the present example, the environment is provided in the form of a scanning station 300 where targets 118 are moved across or along a scanning surface 305 and are scanned by the imaging reader 106 to identify the targets 118. In some embodiments, the scanning station is a point-of-sale (POS) station, which may have a computer system and an interface, not shown, for optically scanning goods and identifying the goods and characteristics of the goods for affecting a transaction. In some embodiments, the scanning station is part of an inventory delivery system, where goods are conveyed by the scanning surface or across the scanning surface to monitor and control delivery of the goods, for example, shipping goods from a facility or receiving shipped goods to a facility.

The scanning surface 305 may be a stationary surface, such that the targets 118 are manually moved relative to the surface 305. In embodiments, the scanning surface 305 may move the targets 118 or be moved by another automated means. In other embodiments, the scanning surface 305 may be a moving surface, such as by a conveyor system such as a conveyer belt, pneumatic conveyer, wheel conveyer, roller conveyer, chain conveyer, flat conveyer, vertical conveyer, trolley conveyer, or another conveyer. In any case, the targets 118 may be moved continuously relative to the imaging reader 106, such that the targets 118 are constantly moving through a FOV of the station imaging reader 106. In some examples, the targets 118 move in a discretized manner, where, at least part of the time the targets 118 are maintained fixed on the surface 305 relative to the imaging reader 106 for a period of time, sufficient to allow one or more images to be captured of the targets 118.

The targets 118 may move along different substantially linear paths such as a near field path 310A, and a far field path 310B, each path traversing a different FOV of the imaging reader 106 at a different distance from the imaging reader 106. For example, as illustrated, the target 118 along the near field path 310A traverses a near FOV 308A, while the target 118 along the far field path 310B traverse a far FOV 308B of the imaging reader 106. The near and far FsOV may be tow fields of view of a single autofocus imaging system at different focuses, may be of different cameras with each camera configured to image a different focal plane, or another single or multi-imaging sensor optical setup. The paths 310A, 310B are for illustration purposes, as the targets 118 may traverse across the surface 105 at any distance from the imaging reader 106.

In some exemplary embodiments, the imaging reader 106 includes a variable focus imaging system, in which the reader 106 continuously scans for an object of interest (OOI) (such as the targets 118), in a FOV until the object, or a region of interest of the OOI (e.g., a barcode, serial number, other identifiers, etc.) is located and then brought sufficiently into focus on the imaging sensor. The disclosed systems and methods enable the increased efficiency, and therefore reduced time required, for reading identifiers on an OOI, e.g., to identify an indicia or other barcode on the good. At least some of those scanning parameters, and/or calibration parameters described further herein, may be stored on a server 112 communicatively coupled to the imaging reader 106, and the imaging reader may retrieve the scanning parameters, or calibration parameters, from the server or another memory or form of storage.

The imaging reader 106 further includes FOV imaging system 220 for providing aiming guidance to a user (e.g., the clerk 108) of the imaging reader 106. For example, the illumination source 202 (depicted in FIG. 2) may provide a rectangular illumination field to the near FOV 308A to indicate to the user the size, shape, and position of the near FOV. Therefore, the user may more easily position the target 118 in the near FOV, increasing scanning speed and efficiency. The aiming source 203 provides an aiming pattern to the far FOV 308B to indicate a position and size of the far FOV 208B. A user may then use the aiming pattern to better determine where to place the target 118 for scanning of the target in the far FOV 308B.

Figure 4:
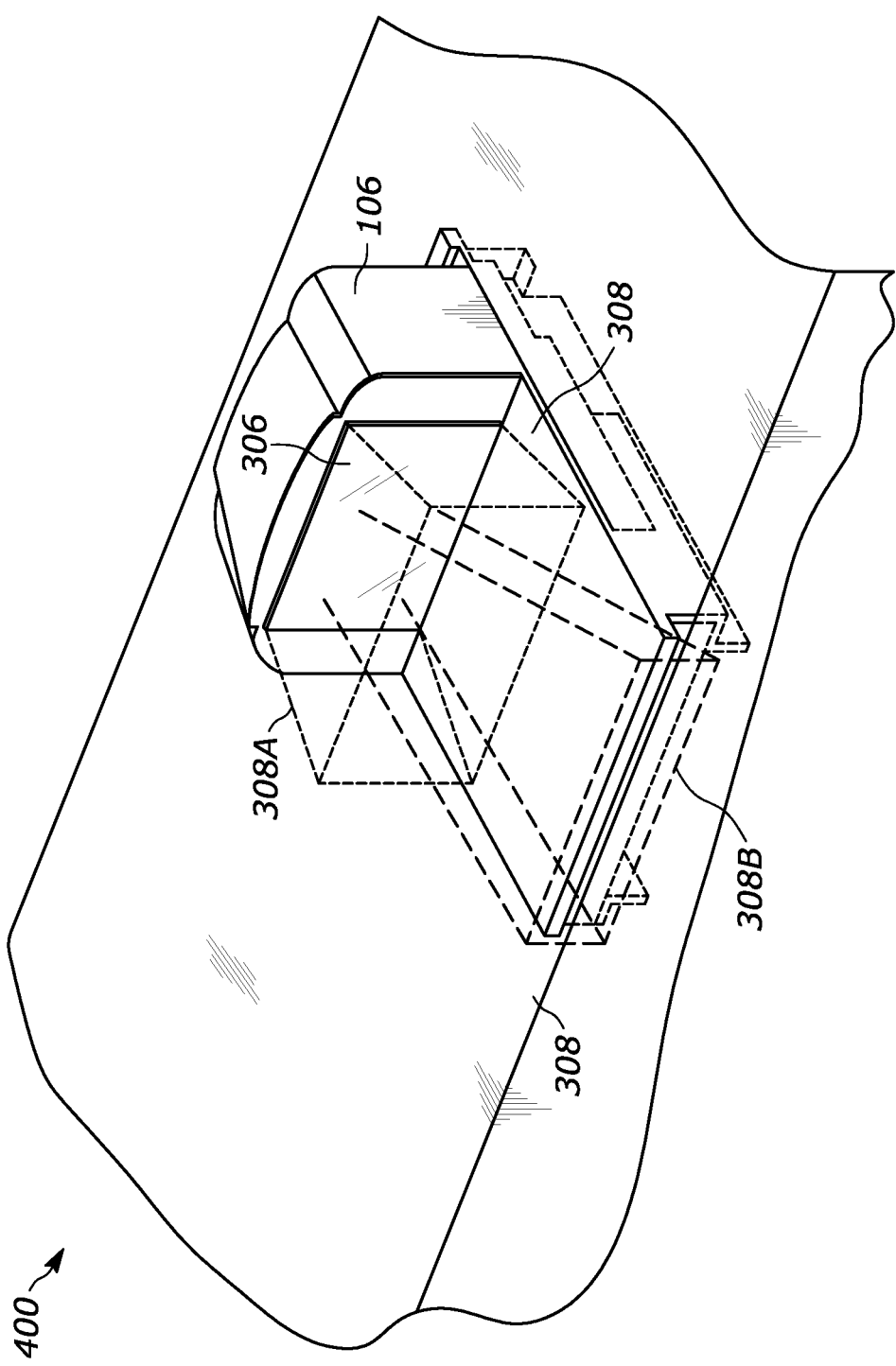
FIG. 4 illustrates an exemplary scanning station having an imaging reader in the form of a bioptic scanner with a multi-FOV aiming system.

FIG. 4 illustrates an exemplary scanning station 400 having an imaging reader 106, in the form of a bioptic scanner, such as the bioptic scanner of FIG. 1 including the imaging reader 106 of FIG. 2. For clarity and simplicity, the following methods and system operations will be described with reference only to vertical tower or raised housing 214. It should be understood that the disclosed methods and systems for providing multi-FOV aiming patterns may be applied to the lower housing 126, and/or any other imaging platforms from any imaging directions for systems having multiple FsOV. The scanning station of FIG. 4 has near FOV 308A and far FOV 308B at which different aiming illuminations or aiming patterns may be provided to guide a user to a desired scanning FOV. Further, while only the near and far FsOV 308A and 308B are illustrated, it should be understood that the multiple-FOV aiming system may be scaled for any number of FsOV.

FIG. 5 illustrates a perspective view of an example handheld scanning device 500 in accordance with the teachings of this disclosure. The scanning device 500 may be referred to as an indicia reader. In the example shown, the scanning device 500 includes a housing 501 having a handle or a lower housing portion 502 and an optical imaging assembly 503 that includes an imaging reader such as the imaging reader 106 of FIG. 2. The optical imaging assembly 503 is at least partially positioned within the housing 501 and has a near FOV 308A and a far FOV 308B. The scanning device 500 also includes an optically transmissive window 506 and a trigger 508. The optical imaging assembly 503 includes one or more image sensors, such as the image sensor 206, that may include a plurality of photo-sensitive elements. The photo-sensitive elements may be arranged in a pattern and may form a substantially flat surface. For example, the photo-sensitive elements may be arranged in a grid or a series of arrays forming a 2D surface. The image sensor(s) of the optical imaging assembly 503 may have an imaging axis that extends through the window 506. Further, the image sensor(s) may include one or more rolling shutter sensors. Additionally, the optical imaging assembly 503 may include the FOV aiming system 220, or the FOV aiming system 220 may be attachable to the scanning device 500, or external to the scanning device 500 to provide illumination and an aiming pattern for indicative of multiple FsOV of the optical imaging assembly 503.

While illustrated herein as having two FsOV, the near FOV and the far FOV, the imaging reader 106 may have a plurality of FsOV. Accordingly, the FOV aiming system 220 may include a plurality of illumination sources and associated optics with each respective illumination source providing radiation to a respective FOV with the illumination indicative of the size, shape, and position of the FOV. Further, the FOV aiming system 220 may include a plurality of aiming radiation sources and associated optics that provide aiming radiation in the form of an aiming pattern, with each respective aiming radiation source providing the aiming pattern to a respective FOV of the imaging reader 106.

To operate the scanning device 500, a user may engage the trigger 508 causing the scanning device 500 to capture an image of a target, a product code, or another object. Alternatively, in some examples, the scanning device 500 may be activated in a presentation mode to capture an image of the target, the barcode, or the other object. In presentation mode, the processor 116 is configured to process the one or more images captured by the optical imaging assembly 503 to identify a presence of a target, initiate an identification session in response to the target being identified, and terminate the identification session in response to a lack of targets in either the near or far FsOV 308A and 308B.

Figure 6:
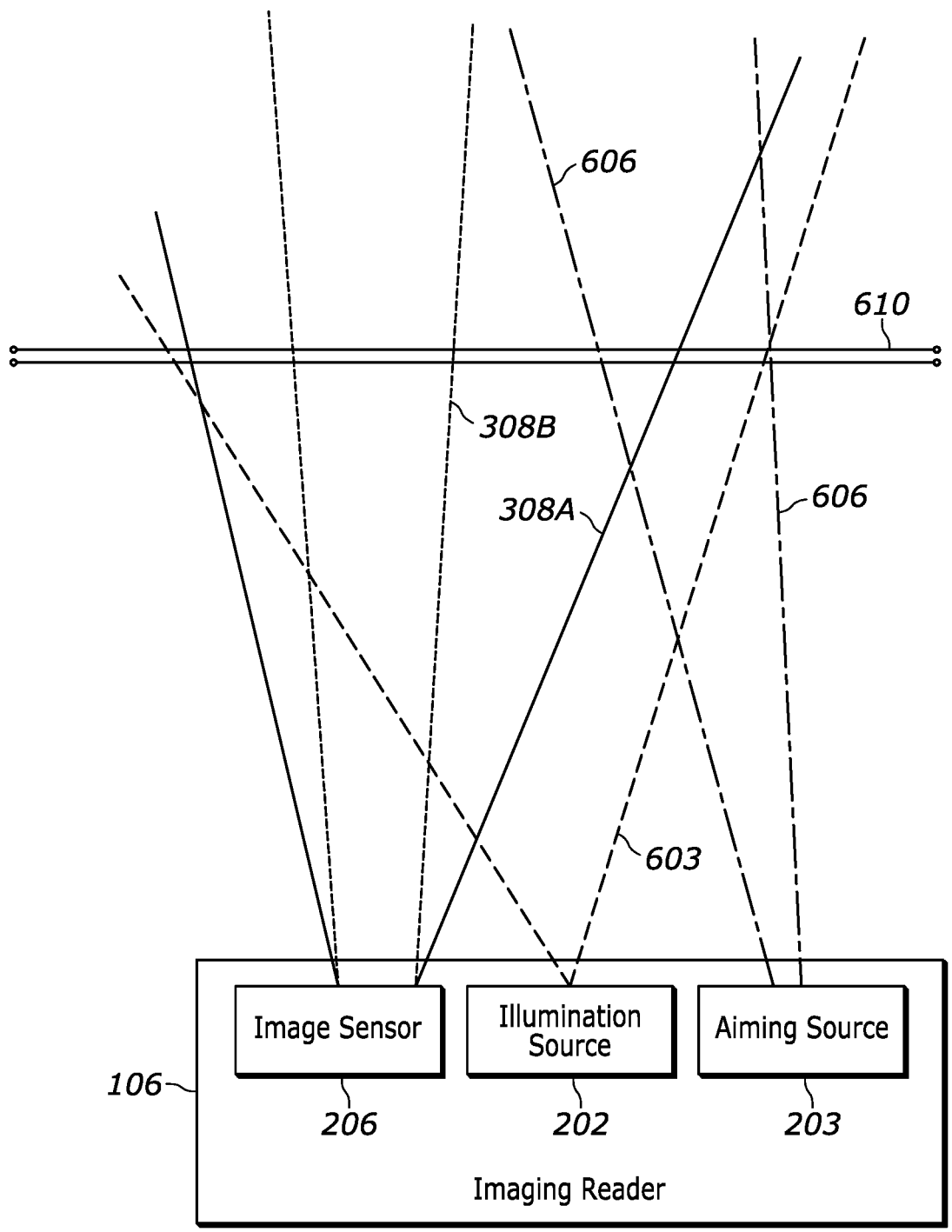
FIG. 6 illustrates a top view of the imaging reader of FIG. 2 with an image sensor and the multi-FOV aiming system.

FIG. 6 illustrates a top view of the imaging reader 106 of FIG. 2 showing the image sensor 206, and the FOV aiming system 203 including the illumination source 202 and the aiming source 203. The imaging sensor 206 has a near FOV 308A and a far FOV 308B, the illumination source 202 provides near field illumination 603 to the near FOV 308A, and the aiming source 203 provides light in the form of an aiming pattern 606 to the far FOV 308B. Further illustrated is a minimum working distance 610 that indicates a distance from the imaging reader 106 at which the near field illumination 603 indicates to a user the position and size of the near FOV of the imaging reader 106. Due to parallax in the system, as the distance from the imaging reader 106 increases from the near FOV 308A to the far FOV 308B, the full-angle of the FOV of the imaging reader may decrease to accommodate for different image resolutions or numbers of pixels of a camera for given scanning and imaging application, such as to increase angular image resolution and decrease pixel field of view.

In examples, the minimum working distance 610 may be at approximately 6 inches from the imaging reader 106, less than 6 inches from the imaging reader 106, 10 inches from the imaging reader 106, or greater 10 inches from the imaging reader 106. The near field illumination 603 may be used to illuminate the near FOV 308A at distances between 1 and 5 inches from the imaging reader 106, between 3 and 8 inches from the imagine reader 106, between 5 and 10 inches from the imaging reader 106, between 8 and 15 inches from the imaging reader 106, between 10 and 25 inches from the imaging reader, at 30 inches or less from the imaging reader 106, at 25 inches or less from the imaging reader, at 20 inches or less from the imaging reader, at 15 inches or less from the imaging reader, or at 10 inches or less from the imagine reader 106. The aiming pattern 606 may be used to illuminate the far FOV 308B at distances of 5 to 10 inches from the imaging reader 106, 8 to 16 inches from the imaging reader 106, 15 to 30 inches from the imaging reader 106, greater than 5 inches from the imaging reader 106, greater than 10 inches from the imaging reader 106, greater than 15 inches from the imaging reader 106, greater than 20 inches from the imaging reader 106, greater than 30 inches from the imaging reader, or greater than 50 inches from the imaging reader 106. Further, the aiming pattern illustrated having a center dot may be useful for performing ranging of a target from the imaging reader 106 between scanning image captures as performed by the imaging reader.

Figure 7:
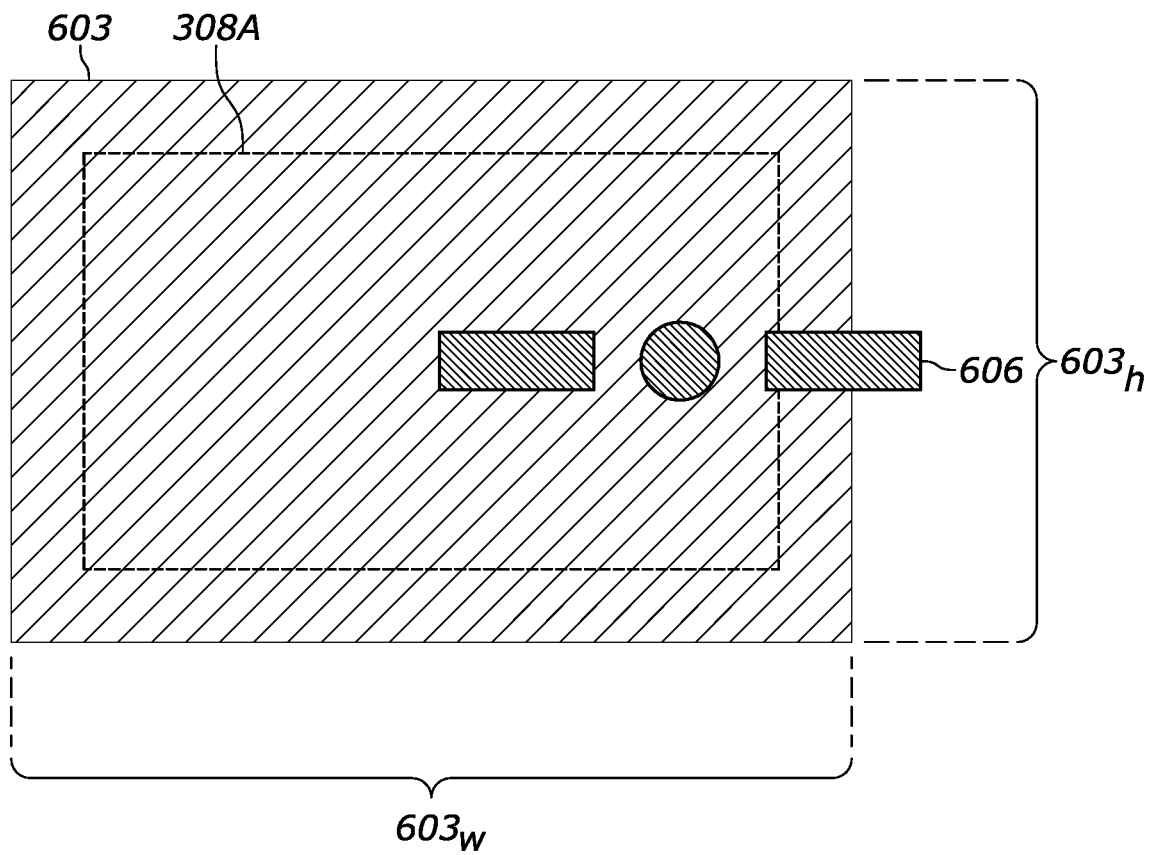
FIG. 7 illustrates an example of near field illumination and an aiming pattern at a minimum working distance from an imaging reader.
Figure 8:
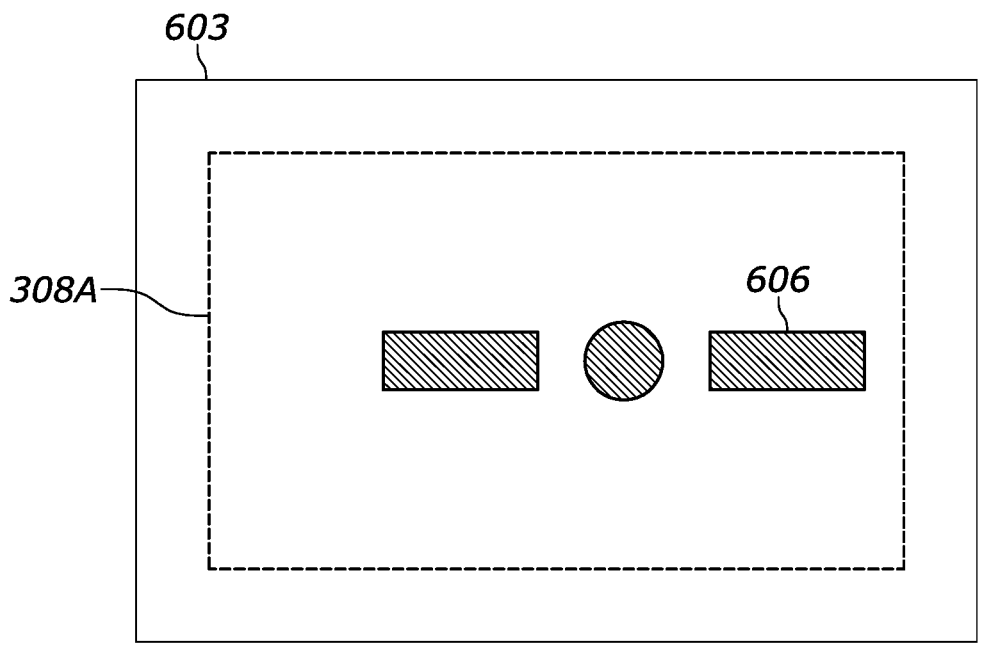
FIG. 8 illustrates an example of near field illumination and an aiming pattern at a typical working distance from an imaging reader.

FIG. 7 illustrates an example of the illumination 603 and aiming pattern 606 at the minimum working distance 610 of the imaging reader 106 of FIG. 6. In the near FOV 308A the illumination 603 indicates the FOV of the imaging reader 106 by the rectangle indicated by the illumination 603. The illumination 603 has a width $603_w$ and height $603h_h$ that are indicative of the width and height of the field of view. The illumination width $603_w$ may also be referred to as a horizontal field of view, and the height $603_h$ may also be referred to as a vertical field of view angle herein. Further, the aiming pattern 606 may be small and not fully visible to a user. The aiming pattern may be outside of, or, as illustrated, partially outside of the illumination 603 indicating that the aiming pattern 606 does not indicate the FOV of the imaging reader 106 at the working distance 610 illustrated in FIG. 7. FIG. 8 illustrates an example of the illumination 603 and aiming pattern 606 in the near FOV 308B at a distance farther from the imaging reader 106 than the working distance 610. At the distance illustrated in FIG. 8, the illumination 603 is larger both vertically and horizontally than the near FOV 308A of the imaging reader 106, and the illumination 603 is still indicative of the near FOV 308A since the illumination 603 contains the near FOV 308A and a user may use the illumination 603 to approximately determine the position and size of the near FOV 308A. As illustrated, the aiming pattern 606 of FIG. 8 is closer to the center of the near FOV 308A at distances further from the imaging reader 106.

Figure 9:
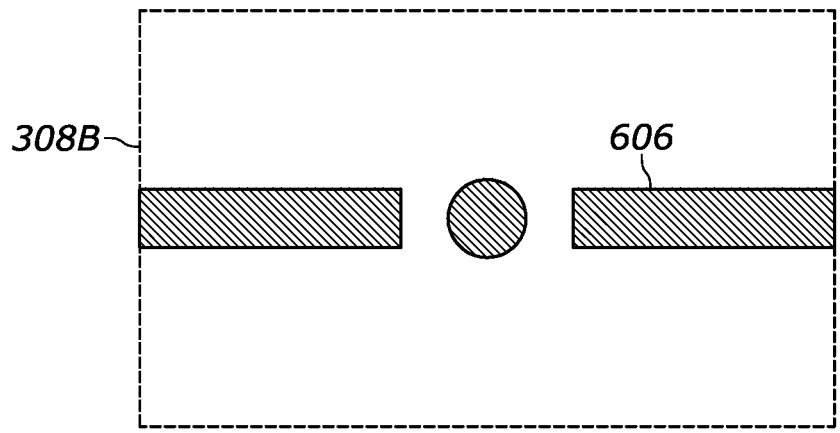
FIG. 9 illustrates an example of an aiming pattern in a far field of view of an imaging reader.

FIG. 9 illustrates an example of the aiming pattern 606 and a far FOV 308B, the illumination 603 may not be visible, or may be barely visible, to a user of the imaging reader 106 at distances in the far FOV 308B if the imaging reader 106. Therefore, the aiming pattern 606 may be used as the indicator of the FOV of the imaging reader 106 at distances corresponding to the far FOV 308B. While illustrated in FIGS. 7 and 8 as a horizontal aiming pattern with a dot and two dashed lines, the aiming pattern may include a single solid line, a plurality of dots, a plurality of line segments, a dashed line, a dotted line, or a dot-dash line with any of the proposed lines being horizontal or vertical, and may also include either a single line pattern or multiple line patterns. In embodiments, the one dimensional nature of lines of the aiming pattern 606 allows for the aiming pattern to be visible by a user of the imaging reader 106, while preventing the aiming pattern from being captured in images which will be further described with reference to FIG. 7. Further, the aiming pattern may be used for performing ranging by the imaging reader 106 or another system during periods of time when the imaging reader 106 is not actively imaging a region of the near FOV 308A or far FOV 308B that contains the aiming pattern 606.

Figure 10:
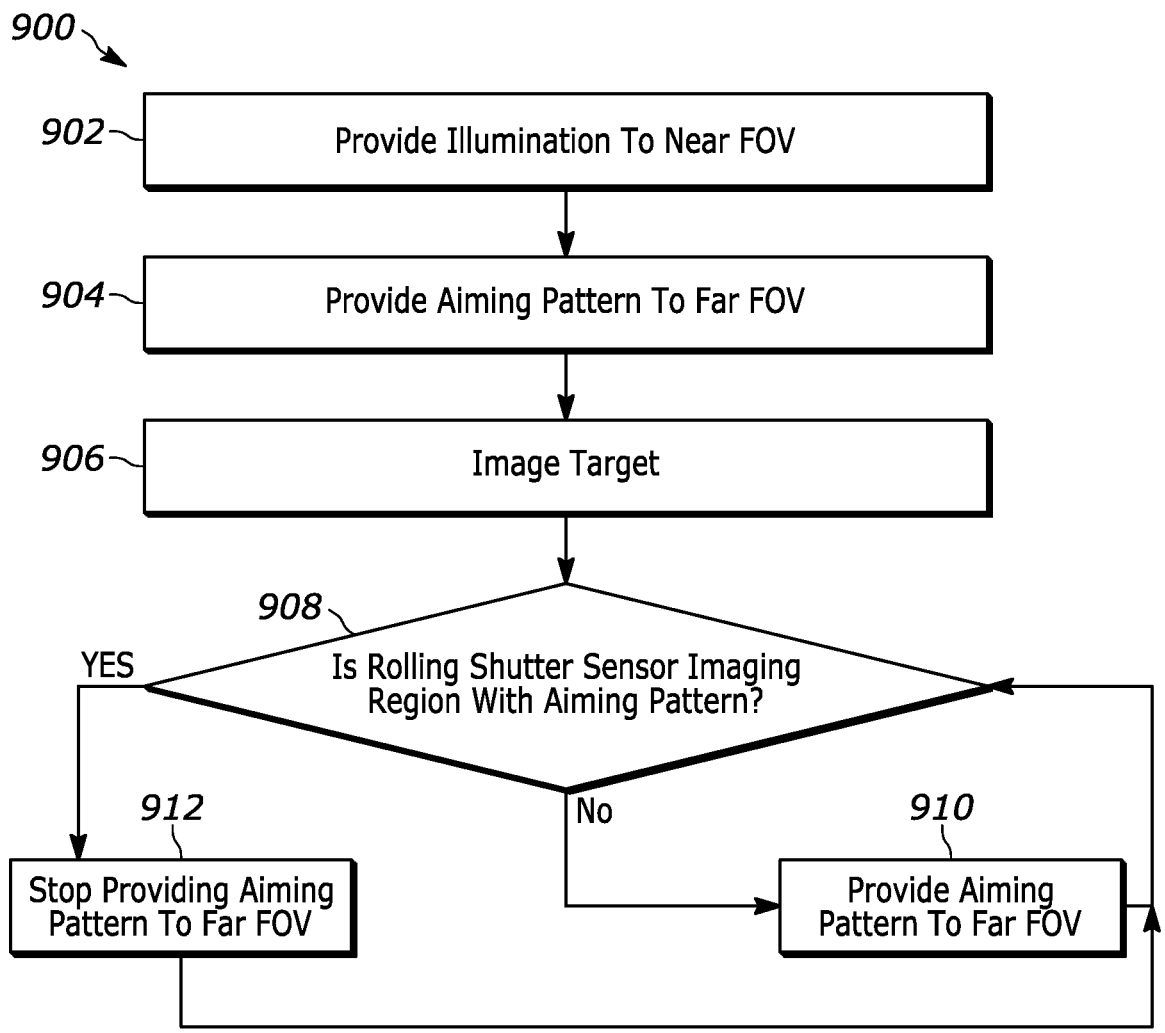
FIG. 10 illustrates a flow diagram of a method for providing multi-FOV aiming using near FOV illumination and a far FOV aiming pattern.

FIG. 10 is a flow diagram of a method 900 for providing multi-FOV aiming using near FOV illumination and a far FOV aiming pattern. The method 900 may be performed by any of the systems described herein. For clarity, the method 900 will be described with reference to the system 200 of FIG. 2. The method 900 includes providing illumination to a near FOV of an imaging system at 902. The illumination may be provided by the illumination source 202. The illumination is indicative of the near field of view of the imaging stage 204 of the imaging reader 106. The method 900 further includes providing light in the form of an aiming pattern to a far field of view of the imaging stage 204 of the imaging reader 106 at 904. The light for the aiming pattern may be provided by the aiming source 203 and which may include one or more lasers or laser diodes. The aiming pattern may be a substantially one dimensional pattern such as a line, dotted line, dashed line, or dot-dash line. The aiming pattern may be horizontal or vertical in the far FOV. Further, the aiming pattern may be centered, or roughly centered in the far FOV.

The imaging sensor 206 begins capturing an image of a target in either the near FOV or the far FOV at 906. The imaging sensor 206 may be a rolling shutter sensor that has multiple rows of pixels that are optically active at different times. Each row of pixels has (i) an active imaging state wherein a respective row is exposed to light and collecting light for imaging, and (ii) an inactive state wherein the respective row is not exposed to light and/or is not collecting light. The controller 230 controls the aiming source 203 according to the imaging performed by the rolling shutter sensor dependent upon which rows of pixels of the rolling shutter sensor are in the active imaging state at various periods of time. The method determines at 908 if the rolling shutter sensor is imaging the region of the far FOV that contains the aiming pattern (i.e., one or more rows of pixels are actively imaging the region of the far FOV containing the aiming pattern), and the controller controls the aiming source to stop providing the aiming pattern during times when the rolling shutter sensor is imaging the region with the aiming pattern at 912. Further, the control controls the aiming source 203 to provide the aiming pattern during times when the rolling shutter sensor is not imaging the region of the far FOV that contains the aiming pattern at 910. The method 900 may be performed iteratively to obtain a plurality of images of one or more targets in either of the near FOV and/or the far FOV.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Alternative implementations of the examples represented by the block diagram of the system 200 of FIG. 2 includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising", "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An aiming system for a multiple field of view imaging system, the aiming system comprising:
   an illumination field source configured to provide illumination to (i) illuminate a target and (ii) indicate a near field of view of the imaging system;
   a far field aiming source configured to provide a radiation pattern to indicate a far field of view of the imaging system;
   near field optics configured to receive the illumination from the illumination field source and further configured to form the first illumination to provide near field illumination to the near field of view of the imaging system, wherein the near field illumination has a vertical field of view angle and a horizontal field of view angle;
   far field optics configured to receive the radiation pattern from the aiming source and further configured to provide the radiation pattern to the far field to indicate the far field of view of the imaging system;
   a rolling shutter sensor disposed to receive light from the target and configured to image the target in either of (i) the near field of view or (ii) the far field of view of the imaging system, the rolling shutter sensor including a plurality of rows of pixels with each row having an active imaging state wherein the row is exposed to collect light, and an inactive state wherein the row is not exposed and therefore not collecting light; and
   a controller in communication with the far field aiming source to control operation of the far field aiming source to cause the aiming source to, during a frame of the rolling shutter sensor, (i) provide the radiation pattern when the rolling shutter sensor is not imaging the region of the far field of view of the imaging system that contains the radiation pattern and (ii) not provide the radiation pattern when the rolling shutter sensor is imaging the region of the far field of view of the imaging system that contains the radiation pattern.

2. The aiming system of claim 1, wherein the far field aiming source comprises a laser.

3. The aiming system of claim 1, wherein the radiation pattern comprises a one-dimensional pattern along one dimension of the far field of view of the imaging system.

4. The aiming system of claim 1, wherein the illumination field source comprises a light emitting diode.

5. The aiming system of claim 1, wherein the illumination comprises a rectangular illumination field indicative of the near field of view of the imaging system.

* * * * *